(12) United States Patent
Osterberg

(10) Patent No.: US 7,013,057 B2
(45) Date of Patent: Mar. 14, 2006

(54) HIGH SPEED OPTICAL ELEMENT SWITCHING MECHANISM

(75) Inventor: David A. Osterberg, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 359 days.

(21) Appl. No.: 10/103,534

(22) Filed: Mar. 20, 2002

(65) Prior Publication Data

US 2003/0179982 A1 Sep. 25, 2003

(51) Int. Cl.
*G02B 6/26* (2006.01)

(52) U.S. Cl. ............................. 385/16; 385/22; 385/20; 385/17

(58) Field of Classification Search ............ 385/16–24, 385/14, 40
See application file for complete search history.

(56) References Cited

U.S. PATENT DOCUMENTS 5,455,707 A 10/1995 Cipolla
5,852,519 A 12/1998 Do et al.
5,999,669 A * 12/1999 Pan et al. .................. 385/18
6,266,196 B1 7/2001 Do et al.

FOREIGN PATENT DOCUMENTS

| EP | O 115 126 A1 | 8/1984 |
| GB | 2 182 747 A | 5/1987 |
| JP | 2000 305150 A | 11/2000 |

* cited by examiner

*Primary Examiner*—Phan T. H. Palmer
(74) *Attorney, Agent, or Firm*—Kurt A. Luther

(57) ABSTRACT

The present invention provides an optical element switching mechanism that overcomes many of the disadvantages found in the prior art. The switching mechanism uses a balanced arm, with an optical element attached at one end of the arm. The arm is suspended on a axis that allows it to rotate from a first position to a second position. The arm is balanced to provide low force disturbance during this movement. A spring is coupled to the arm that provides the rotational energy to move the arm. The spring is coupled such that its neutral position is between the first and second positions, and thus the spring provides the energy to move the arm from the first position to the second position and vice versa. A latch mechanism is also provided for selectively holding the arm in the first position or second position. Additionally, the latch mechanism can provide additional energy needed to catch and move the arm into final position.

24 Claims, 7 Drawing Sheets

HIGH SPEED OPTICAL ELEMENT SWITCHING MECHANISM

BACKGROUND OF THE INVENTION

1. Technical Field

This invention generally relates to optical elements, and more specifically relates to mechanisms for high speed switching of optical elements.

2. Background Art

In optical instruments there is a need in many different applications for the ability to rapidly insert and remove optical elements into an aperture or optical beam. Traditionally, this switching has been accomplished by the use of a wheel mechanism that rotates various elements in and out of the aperture.

In wheel mechanisms, optical elements are arranged around the perimeter of a wheel. As different elements are needed, a motor or other driver rotates the wheel, stopping when the desired element is in the optical path. This allows different optical elements to inserted into optical path as desired.

Unfortunately, wheel mechanisms suffer from several significant disadvantages. For example, the amount of time and energy used to switch from one element to another can be unacceptable for many applications. This is an especially significant issue when the wheel switches from one element to another that is on the opposite side of the wheel. In some cases it can be difficult to rotate the wheel fast enough to switch it from one side of the wheel to the other. Additionally, the amount of power required to move the wheel from one end of the other can be excessive. These limitations all arise from the fact that the traditional wheel provides a sequential rather than random access to the elements at the edges of the wheel.

Another difficultly in using traditional wheel solutions is that the rapid movement of the wheel can cause disturbances to the system that can blur the image. This is especially significant in applications that require precise control over the optical system, such as in satellite applications. To compensate for the force disturbances caused by the rapidly moving wheel, traditional approaches have been forced to allow for long settling periods after wheel movement or use of complex force compensation and/or isolation mechanisms that significantly increase the complexity of the system while decreasing the reliability. These mechanisms also require significant power that must be supplied and dissipated, negatively impacting the thermal stability of the device.

Thus, what is needed is an improved optical element switch mechanism that provides for improved switching speed, low power consumption, and reduced disturbances.

SUMMARY

The present invention provides an optical element switching mechanism that overcomes many of the disadvantages found in the prior art. The switching mechanism uses a balanced arm, with an optical element attached at one end of the arm. The arm is suspended on an axis that allows it to rotate from a first position to a second position. The arm is balanced to provide low force disturbance during this movement. A spring is coupled to the arm that provides the rotational energy to move the arm. The spring is coupled such that its neutral position is between the first and second positions, and thus the spring provides the energy to move the arm from the first position to the second position and vice versa. A latch mechanism is also provided for selectively holding the arm in the first position or second position. Additionally, the latch mechanism can provide additional energy needed to catch and move the arm into final position.

When the latch mechanism is released, the tension on the arm provided by the spring starts the rotational movement of the arm its axis toward the opposite position. As the arm approaches the opposite position, the latch mechanism provides the additional energy to complete rotation to the new position, and catches and holds the arm in the new position.

The switching mechanism thus provides the ability to rapidly move an optical element in and out of the transmission path with limited power.

In additional embodiments, multiple switching mechanisms are combined together to provide a switching system with the ability to switch multiple optical elements in and out of the optical path. The switching mechanisms are configured to allow one arm to swing into the optical path as the another arm swings out. During operation, the latch mechanism for the optical element currently in the transmission path and the latch mechanism for the desired optical element both release. The springs on the switching mechanisms cause the current optical element to swing out of the optical path, and the desired optical element to swing in. The latch mechanism for the desired optical element catches and holds the arm with the desired optical element in the optical path. The latch mechanism for the other element catches and holds the arm in the opposite position. The opposite movements of the arms provides cancellation of the disturbance moments that would otherwise result from the arm movement.

Thus, the two switching mechanisms together allow one optical element to be quickly substituted for another with limited power consumption and force disturbance outside the system.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE DRAWINGS

The present invention provides an optical element switching mechanism that overcomes many of the disadvantages found in the prior art. The switching mechanism uses a balanced arm, with an optical element attached at one end of the arm. The arm is suspended on an axis that allows it to rotate from a first position to a second position. The arm is balanced to provide low force disturbance during this movement. A spring is coupled to the arm that provides the rotational energy to move the arm. The spring is coupled such that its neutral position is between the first and second positions, and thus the spring provides the energy to move the arm from the first position to the second position and vice versa. A latch mechanism is also provided for selectively holding the arm in the first position or second position. Additionally, the latch mechanism can provide additional energy needed to catch and move the arm into final position.

Figure 1:
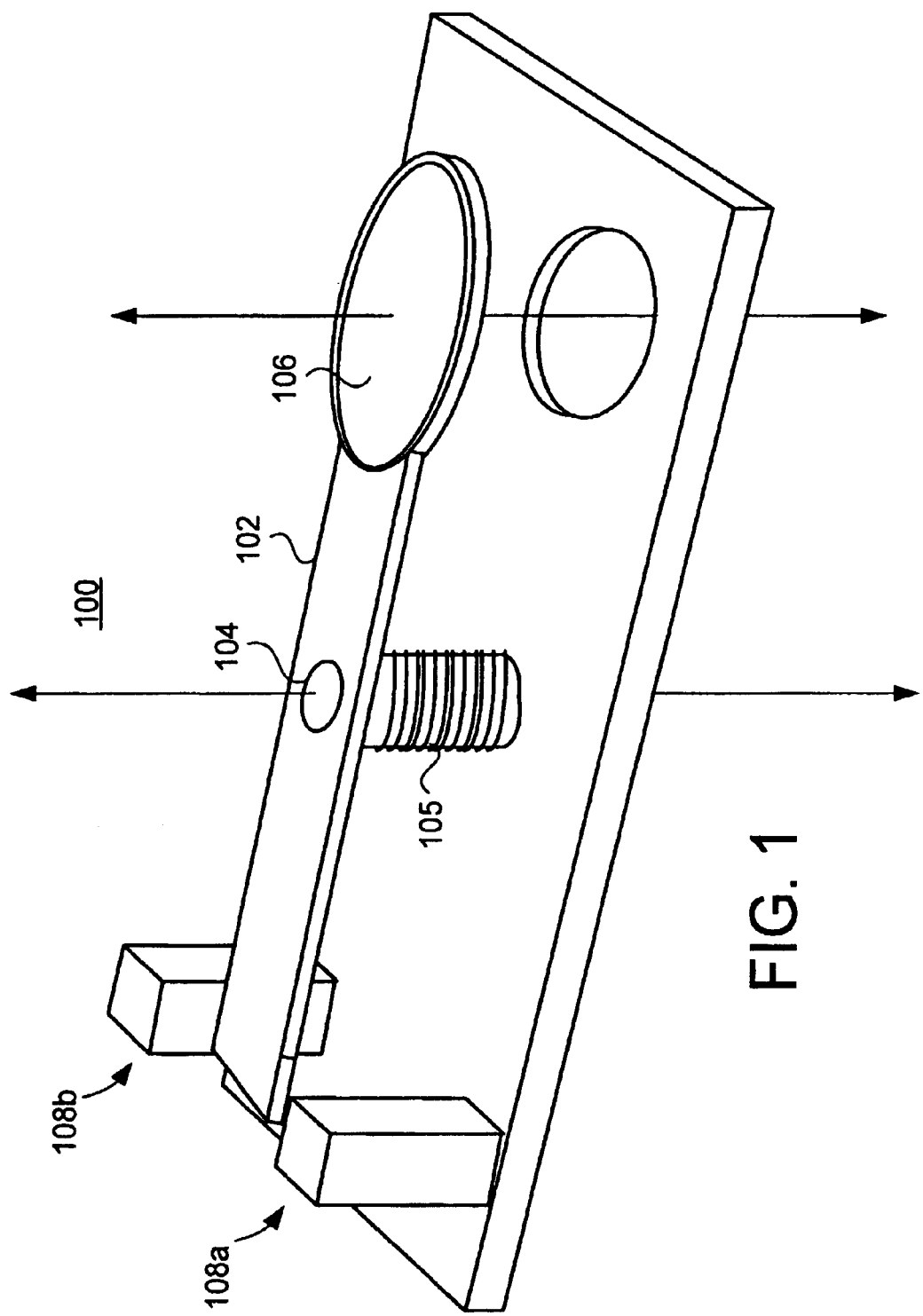
FIG. 1 is a perspective view of an optical element switching mechanism.

Turning now to FIG. 1, an exemplary optical element switching mechanism 100 is illustrated. Switching mechanism 100 includes an arm 102, an axis 104, a spring 105 coupled to the arm, an optical element 106 and two latch mechanisms 108a and 108b. The arm 104 can be any structural member designed to accept the optical element. The arm preferably is made with sufficient rigidly to effectively control the position of optical element 106. The optical element 106 can be any device or combination of devices that is desirable to selectively insert into the optical path. Common devices that could be used as optical element 106 include various types and combinations of filters and mirrors and optical sources such as black body sources. The axis 104 can be any axis that provides for positioning and rotational movement of the arm 102. Examples of suitable axis 102 include flex pivots, bearings or flexural elements that provide suitable rotational movement. The spring 105 is coupled to the arm 102 provides the rotational energy for moving the arm 102 in and out of the optical path. The spring 105 can be any suitable spring structure that provides sufficient energy to move the arm within desired time constraints. The spring is coupled such that its neutral position is substantially centered with the arm being between the optical path and the outside position. Thus, the spring 105 can provide for moving the arm 102 in both directions. Examples of springs that can be used for spring 105 include rotational springs such as coil, helical or torsion bars, or translational tension or compression springs. The latch mechanisms 108a and 108b provide the ability to selectively hold the arm in both positions. Each latch mechanism 108 can comprise any suitable mechanism for catching and holding the arm 102 in position. Examples of mechanisms that can be used for latch mechanism 108 include magnetic devices that provide the ability to selectively hold the arm 102. Additionally, the latch mechanism 108 can be configured to provide any additional energy needed to catch and move the arm into final position during rotation. In the alternative, a separate rotational mechanism can be added to provide the rotational energy needed to complete rotation.

During operation of switching mechanism 100, the latch mechanisms 108 hold the arm 102 in position until switching is desired. When a latch mechanism 108 (such as 108a) is released, the tension on the arm 102 provided by the spring 105 starts the rotational movement of the arm 102 on the axis 104 toward the opposite position. As the arm 102 approaches the opposite position, the opposite latch mechanism 108 (such as 108b) provides the additional energy to complete rotation to the new position, and catches and holds the arm 102 in the new position. The switching mechanism 100 thus provides the ability to rapidly move an optical element 106 in and out of the optical path with limited power consumption and limited physical disturbance.

Figure 2:
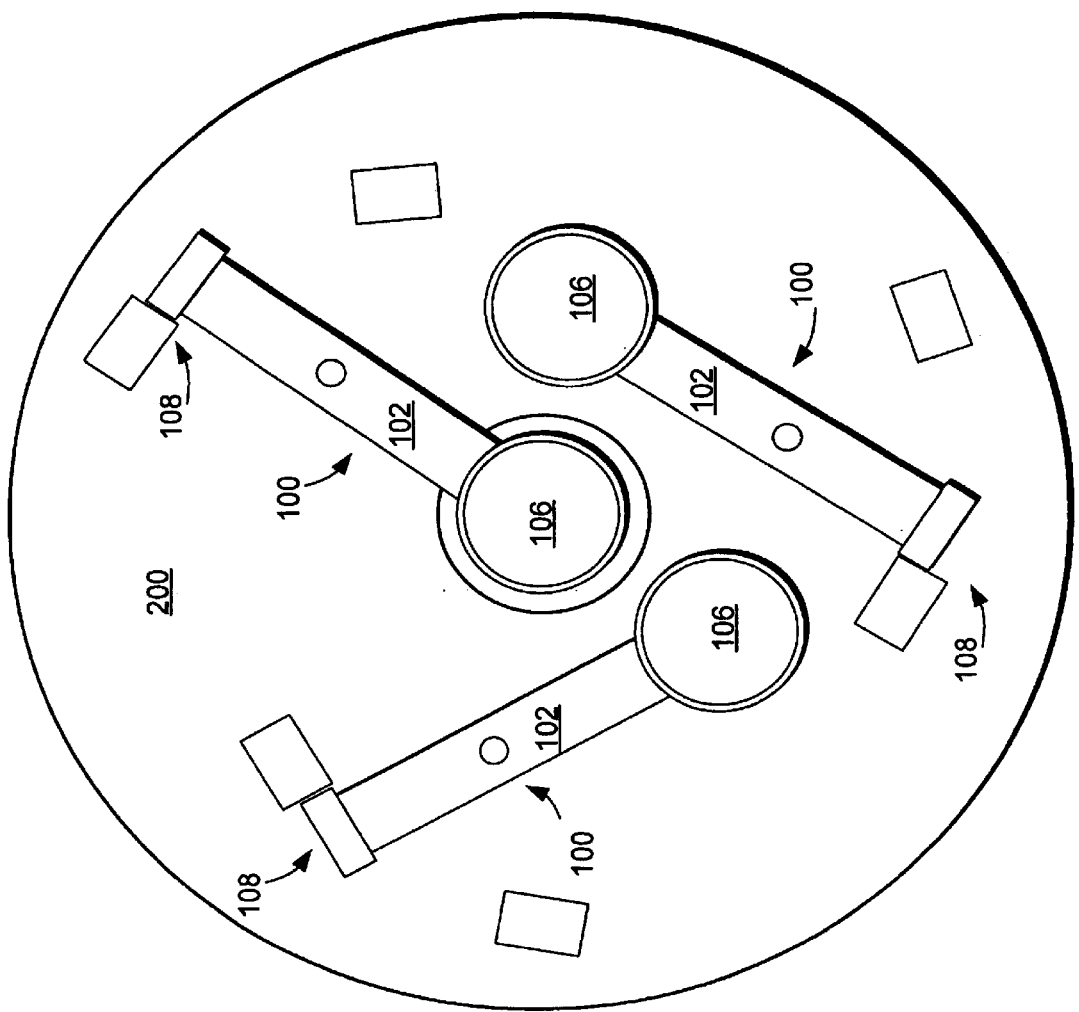
FIGS. 2–4 are top schematic views of an optical element switching system.

Turning now to FIG. 2, an optical switching system 200 is illustrated that utilizes multiple switching mechanisms 100 that are combined together to provide the ability to switch multiple optical elements 106 in and out of the optical path. In the illustrated example, three switching mechanisms 100 are configured to allow three different optical elements 106 to be selected. Of course, this is just an example, and optical switching systems can be desired with any number of switching mechanisms 100 within space limitations.

The optical switching system 200 is desired to allow one optical element 106 to swing into the optical path as another optical element 106 swings out. During operation, the latch mechanism 108 for the optical element 106 currently in the optical path and the latch mechanism 108 for the desired optical element 106 both release. The springs 105 on the switching mechanisms 100 cause the current optical element 106 to swing out of the optical path, and the desired optical element 106 to swing in.

Figure 3:
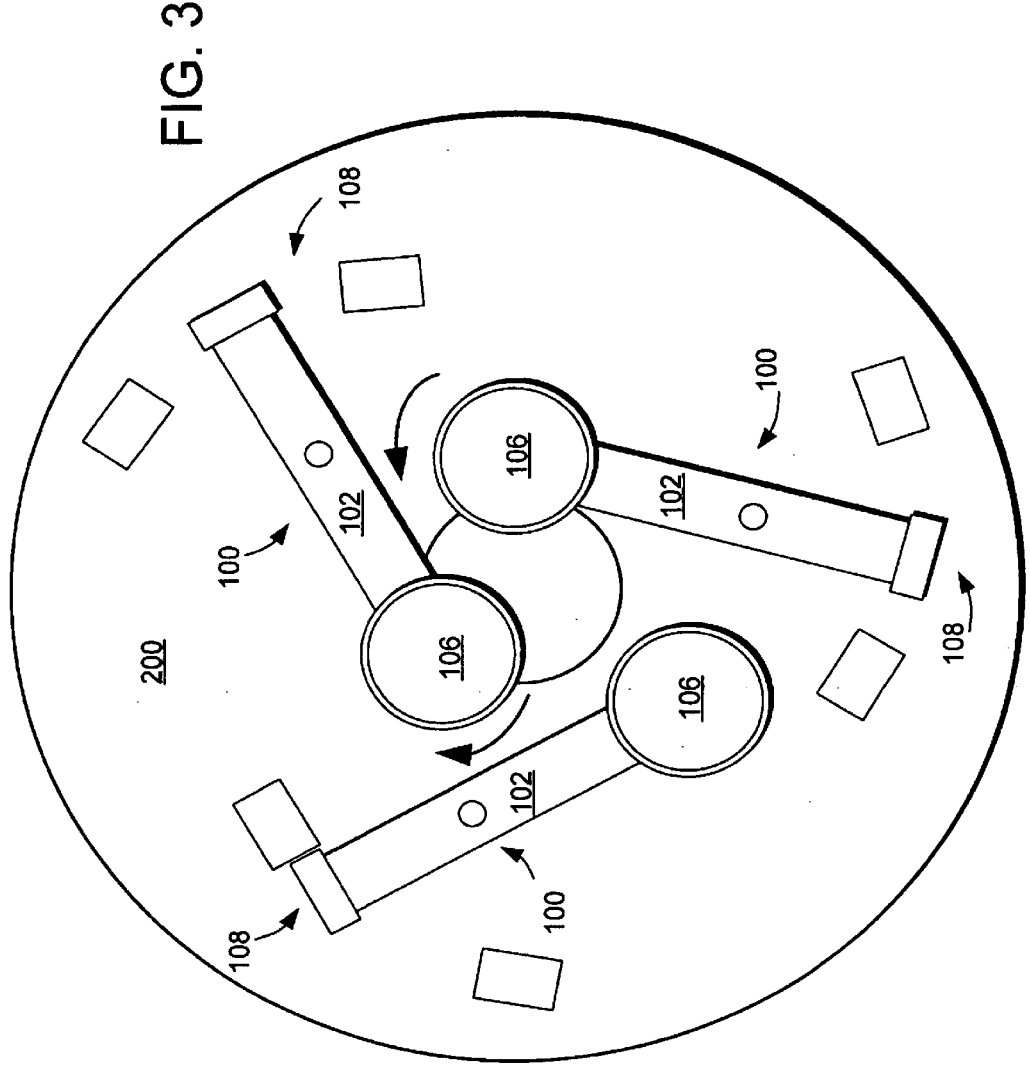

Turning now to FIG. 3, the optical switching system 200 is illustrated after the latch mechanism 108 for the optical element 106 currently in the optical path and the latch mechanism 108 for the desired optical element 106 have released, and the arms 102 are being rotated by springs 105 on the respective switching mechanisms 100, both release. Specifically, the spring 105 for the old optical element 106 is providing the rotational energy to move the old optical element 106 out of the optical path. The spring 105 for the new optical element 106 is likewise providing the rotational energy to move the new optical element 106 into the optical path. It should be noted that the arms are being moved in opposite directions at the same time, and thus together provide cancellation of the disturbance forces that would otherwise result from the arm movement. With matched individually balanced arms, matched springs and equal deflection angles the system produces no external forces, moments or unbalanced momentum.

Figure 4:
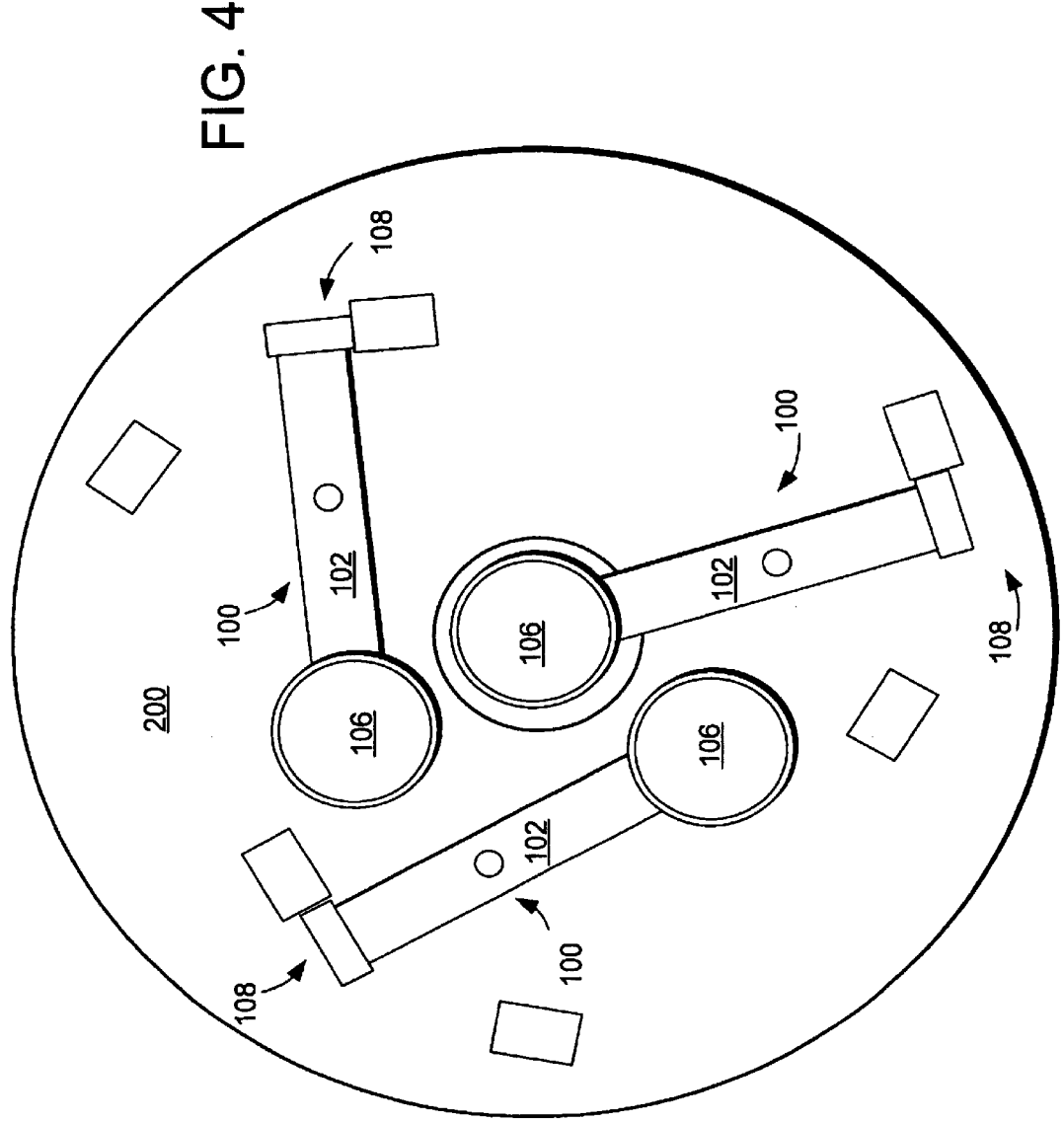

Turning now to FIG. 4, the optical switching system 200 is illustrated after the latch mechanism 108 for the old optical element 106 has caught and held the arm 102 in its new position with the old optical element 106 out of the optical path. Likewise, the latch mechanism 108 for the new optical element 106 has caught and held the arm 102 in its new position with the new optical element 106 in the optical path. Thus, the optical system has provided the ability for one optical element to be quickly substituted for another with limited power consumption and force disturbance outside the system.

Figure 5:
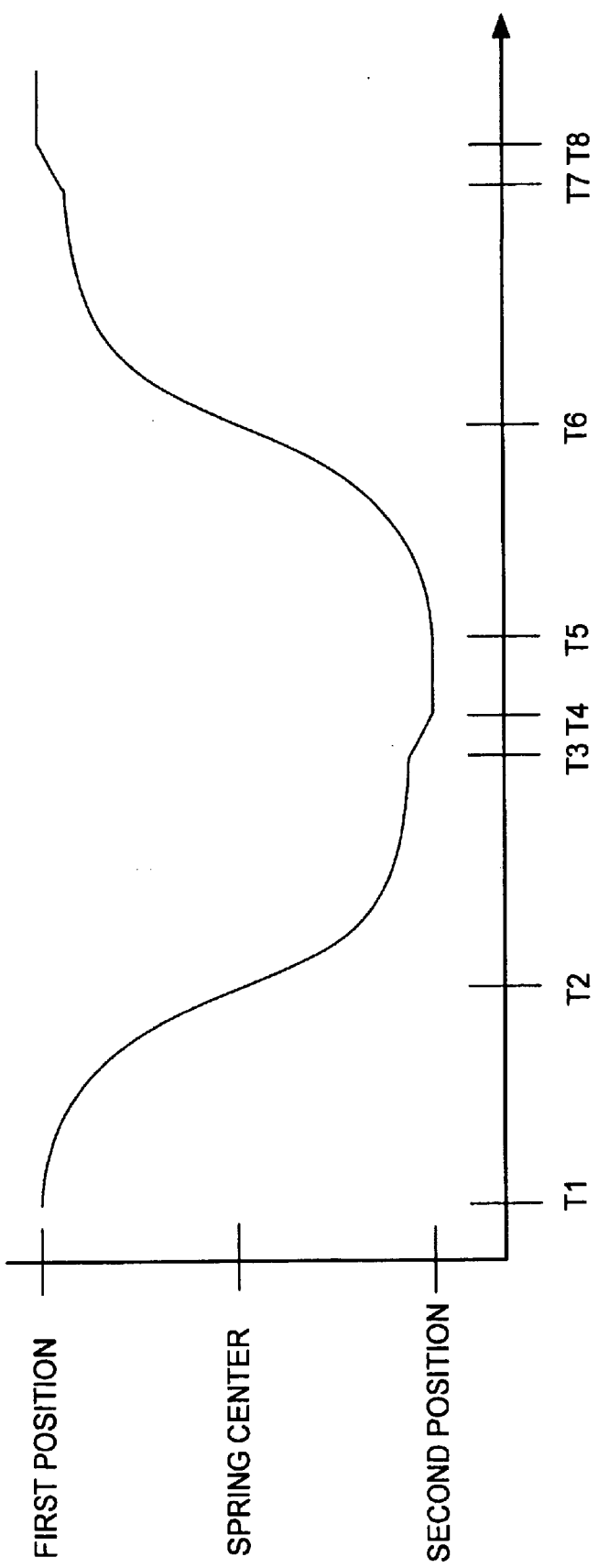
FIG. 5 is a position diagram charting arm position for an optical element switching system.

Turning now to FIG. 5, a timing diagram is illustrated that charts the position of the arm during movement from a first position to a second position, and back to the first position. At time TI, the latch mechanism is released and the spring starts the movement of the arm. Because the potential energy stored in the spring provides the primary energy to move the spring, it follows a typical sinusoidal movement. The parameters of the sinusoidal movement would be determined by the specific parameters of the system, such as the spring constant, rotational stiffness and the inertia of the arm, optical element, latch mechanism and any balancing weights. Typically, the inertia of these elements and the spring constant would be selected to have a first rotational mode mechanical resonance such that the natural period of the resulting oscillation is twice the switching speed that is required. For example, if the optical elements must be switched in 25 milliseconds, the first mode of the system is designed to be at least 20 Hz, with some additional settling time and margin typically provided by increasing the mode slightly above 20 Hz.

At time T2, the arm passes the natural center of the spring. From this point on the spring is no longer providing additional energy to the arm and instead the spring acts to slow the arm and store potential energy for the next switch. At time T3 the kinetic energy provided by the spring has been substantially expended. However, due to unavoidable frictions in the system, the arm has not yet been completely moved to the second position. Accordingly at time T3, the latch mechanism engages the arm to provide the additional energy needed to move the arm the rest of the way to the second position. Thus, at time T4 the arm comes to rest at the second position.

Thus, one cycle of movement from the first position to the second position is completed. The latch mechanism holds the arm in this position as long as desired. When the arm is to be moved again, at time T5, the latch mechanism releases again and the process starts again. At time T6 the arm again passes the natural center of the spring. At time T7 the kinetic energy provided by the spring has been substantially expended, and the latch mechanism is again engaged to provide the additional energy needed to complete the return to the first position, and at time T8 the arm comes to rest at the first position.

The optical switching system can be implemented in many different configurations. For example, the arms can be arranged so that multiple arms move in the same plane (although optical elements in the same plane must be inserted only at different times). Additional optical elements can be added beyond this point by adding additional planes on either side of the first. The additional planes are slightly displaced to allow clearance with the first plane and the additional planes are rotated around the beam slightly to provide non-interference for the springs.

Figure 6:
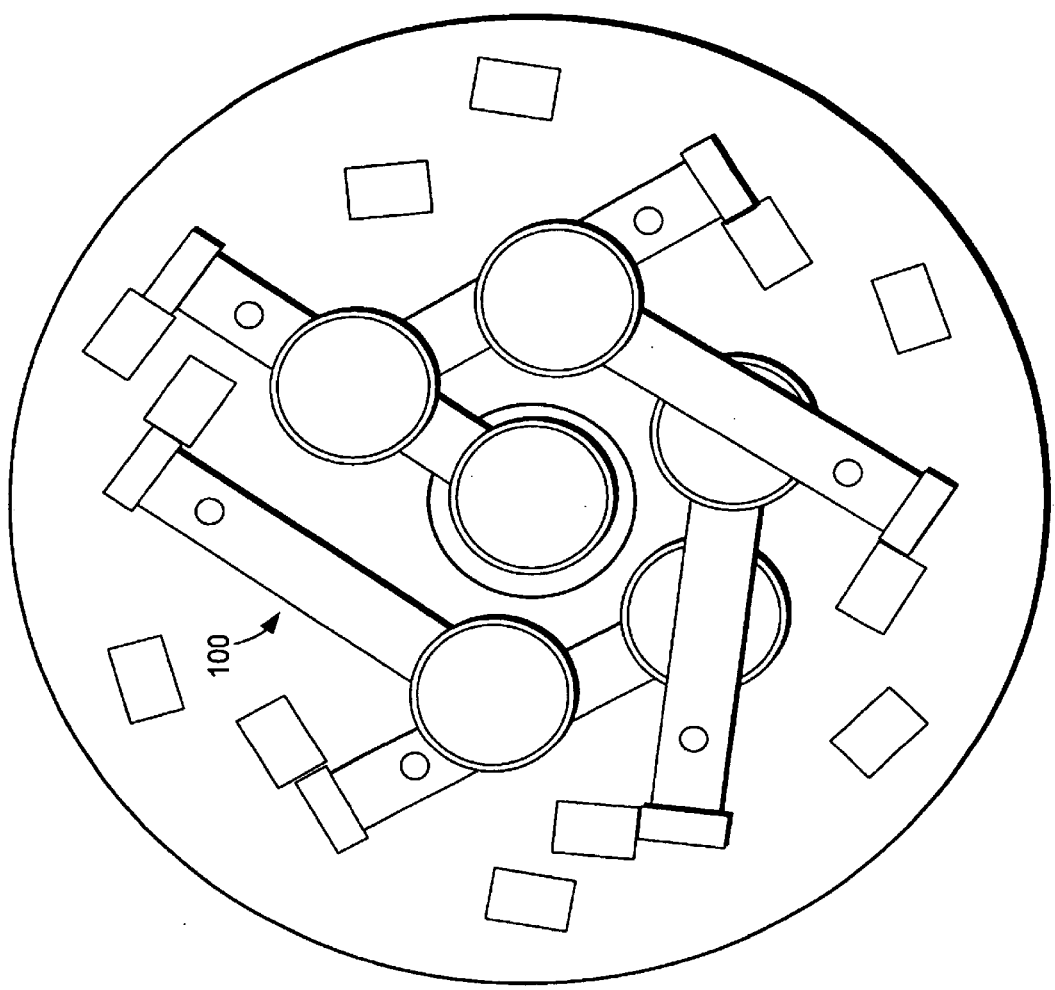
FIG. 6 top schematic views of an optical element switching system.

Turning now to FIG. 6, a optical element switching system is illustrated in which a second group of three switching mechanisms 100 have been added in a different plane than the original group of three.

While the total number of optical elements that can be accommodated by staggering planes in the manner is perhaps unlimited, an exemplary design layout could include three planes of optical elements, with three optical elements in each plane. Using this layout allows for random access to any of the nine optical elements at any time. It should be noted that while this layout could be structured to allow only one optical element in the path at a time, it could also be constructed to allow different elements from different planes to be placed in the optical path at the same time.

It is generally desirable to cancel the effects of arm movement as much as reasonable possible. For this reason, the arms are preferably designed to identical deflection angles, inertia's, springs, and natural frequencies. This can be accomplished is several ways, for example, by selecting springs that are similar in stiffness and then tuning each arm to the same natural frequency. The system is operated where one filter is always inserted as a second is removed. The two resulting moments, forces, and momentum thus essentially cancel. By having each arm balanced the external forces generated by the arm movement is minimized.

The latch mechanism are preferably designed to provide both arm holding and to provide additional kinetic energy to the arm. Each arm is switched (into and out of the optical path) through its own natural resonance where the limits of its harmonic motion are positions fully into the optical path and fully out of the optical path. To make switching consume as little power as possible, it is desirable for this resonance to have low damping (high Q). To make this usefully, the latch mechanisms are used to hold the arm at each extreme. Without the latch mechanisms, the arm would simply oscillate through natural harmonic motion between the two extremes, where kinetic energy (motion) and potential energy (spring force) are exchanged. The latch mechanisms provide the extra kinetic energy needed to make up for losses in the system due to structural damping, windage and such.

The latch mechanism can be either mechanical or magnetic, and its purpose is to hold the arm at either extreme of motion, against the force of the spring. It is desirable, but not necessary that this mechanism be able to hold the arm with no power consumption. It is also advantageous but not required that this mechanism add energy to the system to make up for losses.

Figure 7:
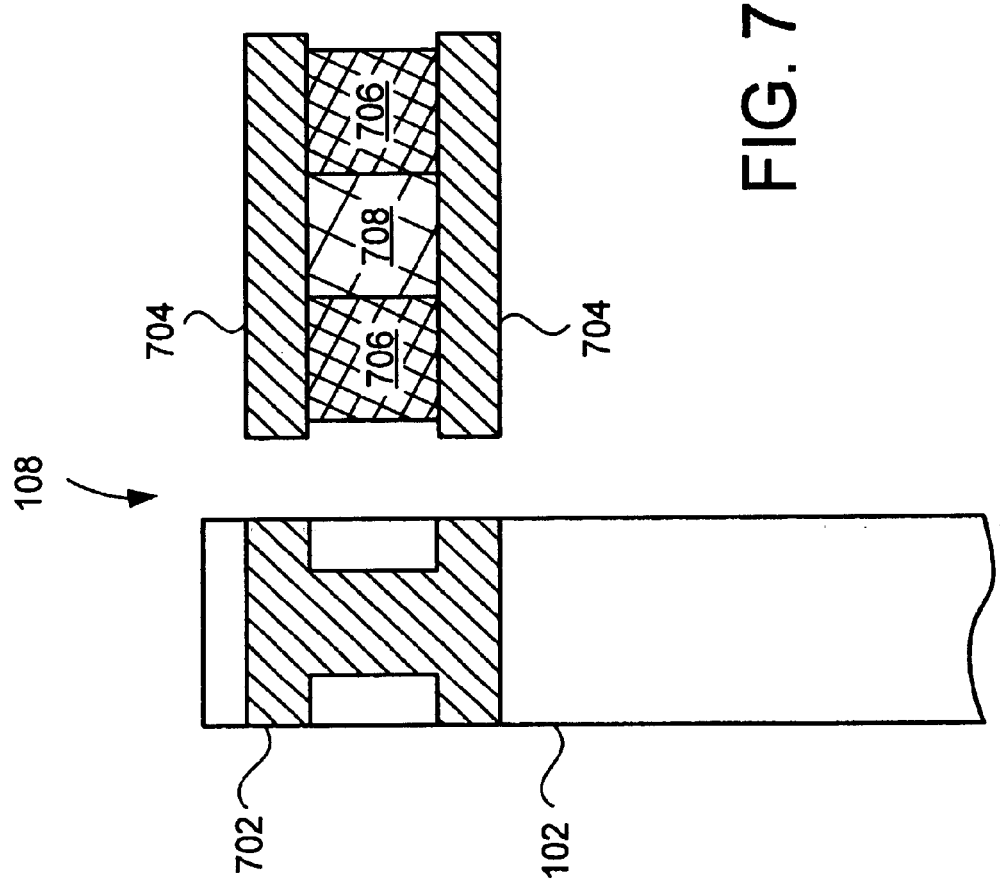
FIG. 7 is a cross-section top view of a latch mechanism.

The preferred implementation of the latch mechanism is using a permanent magnet along with an electromagnetic coil so that the magnet can hold the arm and the electromagnetic coil can oppose the permanent magnet, thus releasing the arm. Since a counter-weight is typically needed to balance the optical filter the preferred implementation is placing the iron on the opposite side of the arm from the optical element. Turning now to FIG. 7, a cross-sectional top view of a preferred latch mechanism 108 is illustrated. The latch mechanism 108 includes an electromagnetic coil 706 surrounding a permanent magnet 708. Surrounding the magnets is a iron casing 704 that completes the flux path. Iron 702 is included on the end of the arm 102. In this embodiment, the iron 702 serves as to add both magnetic attraction to the arm and can act as a counter-weight to balance the arm. It should be noted that although iron is preferred, other suitable ferromagnetic materials could also be used. During operation, the permanent magnet 708 serves to hold the arm in place and does so without requiring the consumption of power. When the arm 102 is to be released, a pulse is provided to the electromagnet 706. This causes the electromagnet 706 to temporarily turn on and overwhelm the magnetic force of the permanent magnet 708, and thus releases the arm 102. The spring force causes the arm 102 to move away from before the electromagnet 706 is turned off. As the arm 102 swings to the other position, the permanent magnet 708 on the other latch mechanism provides the additional energy needed to rotate the arm 102 into final position and hold the arm 102 until it is released by the latch mechanism.

A second implementation of the latch mechanism is to instead locate the permanent magnet on the arm, with the electromagnetic coil again located on the stop. This allows power-off holding at both extremes of motion and the use of much more sophisticated control schemes. For example, the arm could be pushed at the release to add energy to the system and the capture magnet shut-off until the arm arrives and stops. Once stopped, the opposing coil is deactivated and the permanent magnet holds the arm in place. The advantage of this type of latching system is to minimize the disturbances and give the higher structural modes in the arm and spring enough time to settle. I.E., the push excites the arm which settles during transition and then isn't re-excited by slamming into the stop since it stops by simple harmonic motion and then is just held. These controls may be open loop (based only on timing) or closed loop with the addition of position sensors.

A latch mechanism implemented as such can have the additional benefit of providing a way to restart the arm should it settle to the center, zero energy position. Specifically, by controlling the electromagnets to be alternately energized at the natural resonance frequency of the arm, the natural harmonic motion of the arm can be built up until its amplitude is high enough to relatch the arm.

It should be noted that while in the preferred embodiment, the latch mechanism that holds the arm in position is also used to provide the additional kinetic energy needed to make up for losses, the energy could instead be provided by other rotational energy mechanisms. Examples of other mechanisms include torque motors and other such devices. The use of a motor to provide the additional energy allows the use of alternate latch mechanisms that don't add energy to the system such as mechanical latches.

The present invention thus provides an optical element switching mechanism that overcomes many of the disadvantages found in the prior art. The switching mechanism uses a balanced arm, with an optical element attached at one end of the arm. The arm is suspended on an axis that allows it to rotate from a first position to a second position. The arm is balanced to provide low force disturbance during this movement. A spring is coupled to the arm that provides the rotational energy to move the arm. The spring is coupled such that its neutral position is between the first and second positions, and thus the spring provides the energy to move the arm from the first position to the second position and vice versa. A latch mechanism is also provided for selectively holding the arm in the first position or second position. Additionally, the latch mechanism can provide additional energy needed to catch and move the arm into final position. When the latch mechanism is released, the tension on the arm provided by the spring starts the rotational movement of the arm its axis toward the opposite position. As the arm approaches the opposite position, the latch mechanism provides the additional to complete rotation to the new position, and catches and holds the arm in the new position.

The switching mechanism thus provides the ability to rapidly move an optical element in and out of the transmission path with limited power consumption and limited physical disturbance.

While the invention has been particularly shown and described with reference to a preferred exemplary embodiment thereof, it will be understood by those skilled in the art that various changes in form and details may be made therein without departing from the spirit and scope of the invention.

What is claimed is:

1. An optical element switching mechanism, the optical element switching mechanism comprising:
   a rotational axis;
   an arm coupled to the rotational axis, the arm comprising a first end that includes a first optical element;
   a spring mechanism coupled to the arm, the spring mechanism providing rotational energy to rotate the arm on the rotational axis from a first position with the optical element in an optical path to a second position and from the second position to the first position; and
   a latching mechanism, the latching mechanism holding the arm in the first position or in the second position and selectively releasing the arm, wherein the spring mechanism rotates the arm toward the second position when the arm is released from the first position and wherein the spring mechanism rotates the arm toward the first position when the arm is released from the second position.

2. The optical element switching mechanism of claim 1 wherein the optical element comprises an optical element selected from a filter, a mirror or a source.

3. The optical element switching mechanism of claim 2 wherein the latching mechanism further comprises magnetic releasing mechanism for releasing the arm.

4. The optical element switching mechanism of claim 1 further comprising a rotational energy mechanism for providing additional rotational energy to complete arm rotation to the first position and to the second position.

5. The optical element switching mechanism of claim 4 wherein the rotational energy mechanism comprises an electric motor.

6. The optical element switching mechanism of claim 1 wherein the latching mechanism comprises a magnetic holding mechanism.

7. The optical element switching mechanism of claim 1 wherein the rotational axis comprises a flex pivot.

8. The optical element switching mechanism of claim 1 wherein the latching mechanism comprises a permanent magnet for holding the arm and an electro-magnet for overcoming the permanent magnet to releasing the arm.

9. The optical element switching mechanism of claim 1 wherein the latching mechanism further provides additional rotational energy to complete arm rotation to the first position and to the second position.

10. The optical element switching mechanism of claim 1 wherein the spring comprises a helical torsion spring around the rotational axis.

11. The optical element switching mechanism of claim 1 wherein the rotational axis and spring mechanism comprises a torsion bar.

12. An optical element switching system, the optical element switching system comprising:
   a first switching mechanism, the first switching mechanism including:
   a first rotational axis;
   a first arm coupled to the rotational axis, the first arm comprising a first end that includes a first optical element;
   a first spring mechanism coupled to the arm, the first spring mechanism providing rotational energy to rotate the first arm on the first rotational axis from a first position with the optical element in an optical path to a second position and from the second position to the first position;
   a first latching mechanism, the first latching mechanism holding the first arm in the first position or in the second position and selectively releasing the arm;
   a second switching mechanism, the second switching mechanism including:
   a second rotational axis;
   a second arm coupled to the rotational axis, the second arm comprising a first end that includes a second optical element;
   a second spring mechanism coupled to the arm, the second spring mechanism providing rotational energy to rotate the second arm on the second rotational axis from a first position with the second optical element in the optical path to a second position and from the second position to the first position; and
   a second latching mechanism, the second latching mechanism holding the second arm in the first position or in the second position and selectively releasing the second arm;
   wherein when the first latching mechanism releases the first arm from the first position and the second latching mechanism releases the second arm from the second position, the first spring mechanism rotates the first arm toward the second position and the second spring mechanism rotates the second arm toward the first position, and when the first latching mechanism releases the first arm from the second position and the second latching mechanism releases the second arm from the first position, the first spring mechanism rotates the first arm toward the first position and the second spring mechanism rotates the second arm toward the second position.

13. The optical element switching system of claim 12 wherein the first arm and the second arm are in the same plane.

14. The optical element switching system of claim 12 wherein the first arm and the second arm are in different planes.

15. The optical element switching system of claim 12 wherein the first latching mechanism further provides additional rotational energy to complete first arm rotation to the first position and to the second position and wherein the second latching mechanism further provides additional rotational energy to complete second arm rotation to the first position and to the second position.

16. The optical element switching system of claim 12 wherein the first latching mechanism comprises a first permanent magnet for holding the first arm and a first electro-magnet for overcoming the first permanent magnet to release the first arm, and wherein the second latching mechanism comprises a second permanent magnet for holding the second arm and a second electromagnet for overcoming the second permanent magnet to release the second arm.

17. The optical element switching system of claim 12 wherein the first arm rotates from the first position to the second position in a first rotational direction and wherein the second arm rotates from the second position to the first position in a second direction, and wherein the first direction and the second direction are opposite directions to provide momentum cancellation.

18. The optical element switching system of claim 12 wherein the first arm and the second arm are balanced to each other to have substantially equal inertia and displacement.

19. The optical element switching system of claim 12 wherein the first and second optical elements comprises optical elements selected from a filter, a mirror or a source.

20. An optical element switching mechanism, the optical element switching mechanism comprising:

a rotational axis;

a first arm coupled to the rotational axis, the first arm comprising a first end that includes a first optical element;

a spring mechanism coupled to the arm, the spring mechanism providing rotational energy to rotate the arm on the rotational axis from a first position with the optical element in an optical path to a second position and from the second position to the first position; and a latching mechanism, the latching mechanism comprising a first permanent magnet for holding the arm in the first position or in the second position and for providing additional rotational energy to complete first arm rotation to the first position and to the second position, the latching mechanism further comprising a first electro-magnet for overcoming the first permanent magnet to release the first arm.

21. The optical element switching mechanism of claim 20 further comprising a second switching mechanism, the second switching mechanism comprising:

a second rotational axis;

a second arm coupled to the second rotational axis, the second arm comprising an end that includes a second optical element;

a second spring mechanism coupled to the second arm, the second spring mechanism providing rotational energy to rotate the second arm on the second rotational axis from a first position with the second optical element in an optical path to a second position and from the second position to the first position;

a second latching mechanism, the second latching mechanism comprising a second permanent magnet for holding the arm in the first position or in the second position and for providing additional rotational energy to complete first arm rotation to the first position and to the second position, the second latching mechanism further comprising a second electro-magnet for overcoming the second permanent magnet to release the second arm.

22. The optical element switching mechanism of claim 20 wherein the first optical element comprises an optical element selected from a filter, a mirror or a source.

23. The optical element switching system of claim 22 wherein the first arm and the second arm are in the same plane.

24. The optical element switching system of claim 22 wherein the first arm and the second arm are in different planes.

* * * * *